United States Patent
Sacchitella, Jr.

(10) Patent No.: US 11,426,939 B2
(45) Date of Patent: Aug. 30, 2022

(54) THREE DIMENSIONAL PRINTER

(71) Applicant: INTERNATIONAL BUSINESS MACHINES CORPORATION, Armonk, NY (US)

(72) Inventor: Philip N. Sacchitella, Jr., Fairport, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 16/246,323

(22) Filed: Jan. 11, 2019

(65) Prior Publication Data

US 2020/0223141 A1 Jul. 16, 2020

(51) Int. Cl.
*B29C 64/379* (2017.01)
*B29C 64/241* (2017.01)
*B29C 64/245* (2017.01)
*B29C 64/209* (2017.01)
*B33Y 30/00* (2015.01)
*B33Y 40/00* (2020.01)

(52) U.S. Cl.
CPC .......... *B29C 64/379* (2017.08); *B29C 64/209* (2017.08); *B29C 64/241* (2017.08); *B29C 64/245* (2017.08); *B33Y 30/00* (2014.12); *B33Y 40/00* (2014.12)

(58) Field of Classification Search
CPC ... B29C 64/379; B29C 64/245; B29C 64/209; B29C 64/241
See application file for complete search history.

(56) References Cited

U.S. PATENT DOCUMENTS

| | | | |
|---|---|---|---|
| 9,233,507 B2 | 1/2016 | Bibas | |
| 2015/0224718 A1* | 8/2015 | Ederer | .......... B29C 64/245 425/375 |
| 2016/0096319 A1 | 4/2016 | Donaldson et al. | |

(Continued)

FOREIGN PATENT DOCUMENTS

| | | |
|---|---|---|
| CN | 105128332 | 12/2015 |
| WO | WO 2018194446 A1 | 10/2018 |

OTHER PUBLICATIONS

"3D Printer Makerbot MK8 1.75mm Filament all-Metal Bowden Extruder Wire feeder" web advertisement on EBay, [WaybackMachine Snapshot dated Dec. 26, 2016], retrieved from Internet at https://web.archive.org/web/20161226203436/http://www.ebay.de:80/itm/3D-Printer-Makerbot-MK8-1-75mm-Filament-all-Metal-Bowden-Extruder-Wire-feeder-/121981119116, 9 pp.

(Continued)

*Primary Examiner* — Alison L Hindenlang
*Assistant Examiner* — Asha A Thomas
(74) *Attorney, Agent, or Firm* — Alan S. Raynes; Konrad Raynes Davda & Victor LLP

(57) ABSTRACT

Provided are devices and methods relating to three dimensional printing. One embodiment relates to a three dimensional printer comprising a printer base including a rail portion, and a moveable print surface including a plurality of track members coupled to form a loop and configured to move along the rail portion of the printer base. The printer also includes a print head and a print head positioning system configured to move the print head in multiple directions over the print surface. Other embodiments are described and claimed.

20 Claims, 4 Drawing Sheets

(56) References Cited

U.S. PATENT DOCUMENTS

| | | | |
|---|---|---|---|
| 2016/0107395 A1* | 4/2016 | Chang | B29C 33/00 |
| | | | 425/403.1 |
| 2016/0368219 A1 | 12/2016 | Lubin et al. | |
| 2017/0144375 A1* | 5/2017 | Waldrop, III | B29C 64/165 |

OTHER PUBLICATIONS

View of extruder wire feeder for 3D printer, Dec. 14, 2019, 1 pp.
LulzBot® TAZ 6 web page, [Wayback Machine Snapshot dated Sep. 5, 2016], retrieved from Internet at https://web.archive.org/web/2016090532235/https://www/lulzbot.com/store/printers/lulzbot-taz-6, 10 pp.
LulzBot® TAZ 6 user manual, © 2017, 100 pp.
Yiew of LulzBot® TAZ 6 3D printer, Dec. 14, 2019, 1 pp.
View of BLACKBELT printer from web page https://blackbelt-3d.com (2018).
English machine translation of CN105128332 dated Dec. 9, 2015, pp. 8.

* cited by examiner

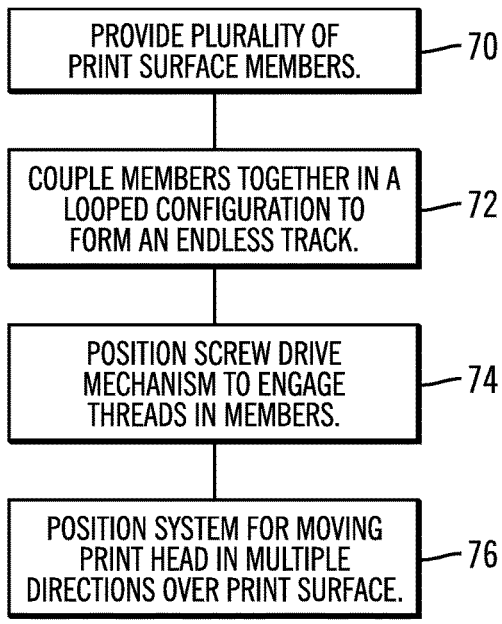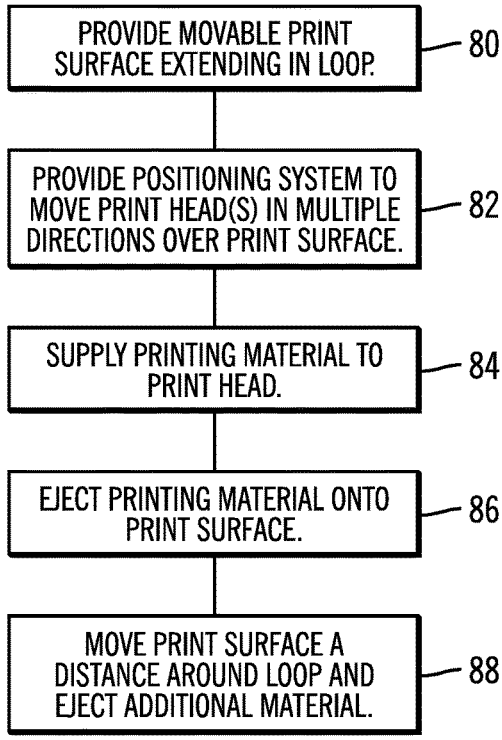

THREE DIMENSIONAL PRINTER

BACKGROUND

1. Field of the Invention

Embodiments of the invention relate to three-dimensional (3D) printing devices and methods.

2. Description of the Related Art

Three-dimensional printing has been around for several decades but has recently become more popular and affordable for mass market use. 3D printing can be an additive manufacturing process for making a three dimensional object from a digital model of virtually any desired shape. One or more print heads may be used to eject successive layers of material onto a substrate. In certain processes a print head that is position controllable delivers a molten liquid onto platform in a desired shape. Successive layers of material are deposited to form the object. The platform may be lowered as each layer is deposited and the object height increases.

SUMMARY

In accordance with embodiments, a 3D printer is provided, comprising a printer base including a rail portion. The printer also includes a moveable print surface including a plurality of track members coupled to form a loop and configured to move along the rail portion of the printer base. The printer also includes a print head and a print head positioning system configured to move the print head in multiple directions over the print surface.

In accordance with other embodiments, a 3D printer is provided, comprising a printer base including a rail portion, and a moveable print surface including a plurality of track members coupled to form a segmented endless track configured to move along a Z axis direction on the rail portion of the printer base. The members include first and second thread receiving regions configured to receive screw threads therein. The printer also includes a print head and a print head positioning system including a frame pivotally coupled to the printer base. The print head positioning system is configured to move the print head along an X axis direction and a Y axis direction over the printer base. The printer also includes first and second rods including screw threads configured to engage the first and second thread receiving regions.

In yet another embodiment, a method for manufacturing a printer is provided. The method comprises providing a plurality of members, and coupling the members together in a looped configuration to form an endless track on a printer base. The method also includes positioning a system for moving a print head in multiple directions over the endless track.

BRIEF DESCRIPTION OF THE SEVERAL VIEWS OF THE DRAWINGS

Referring now to the drawings in which like reference numbers represent corresponding parts throughout:

FIG. 6 is a flowchart of operations for forming a 3D printer, in accordance with certain embodiments.

FIG. 7 is a flowchart of operations for 3D printing, in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain embodiments relate to 3D printing of objects. Among the limitations of typical 3D printers is the size of the print area. For objects that have a long length, the size of the platform limits the size of the object that can be formed. Certain embodiments relate to 3D printing of large objects in relation to the size of the printer.

Figure 1:
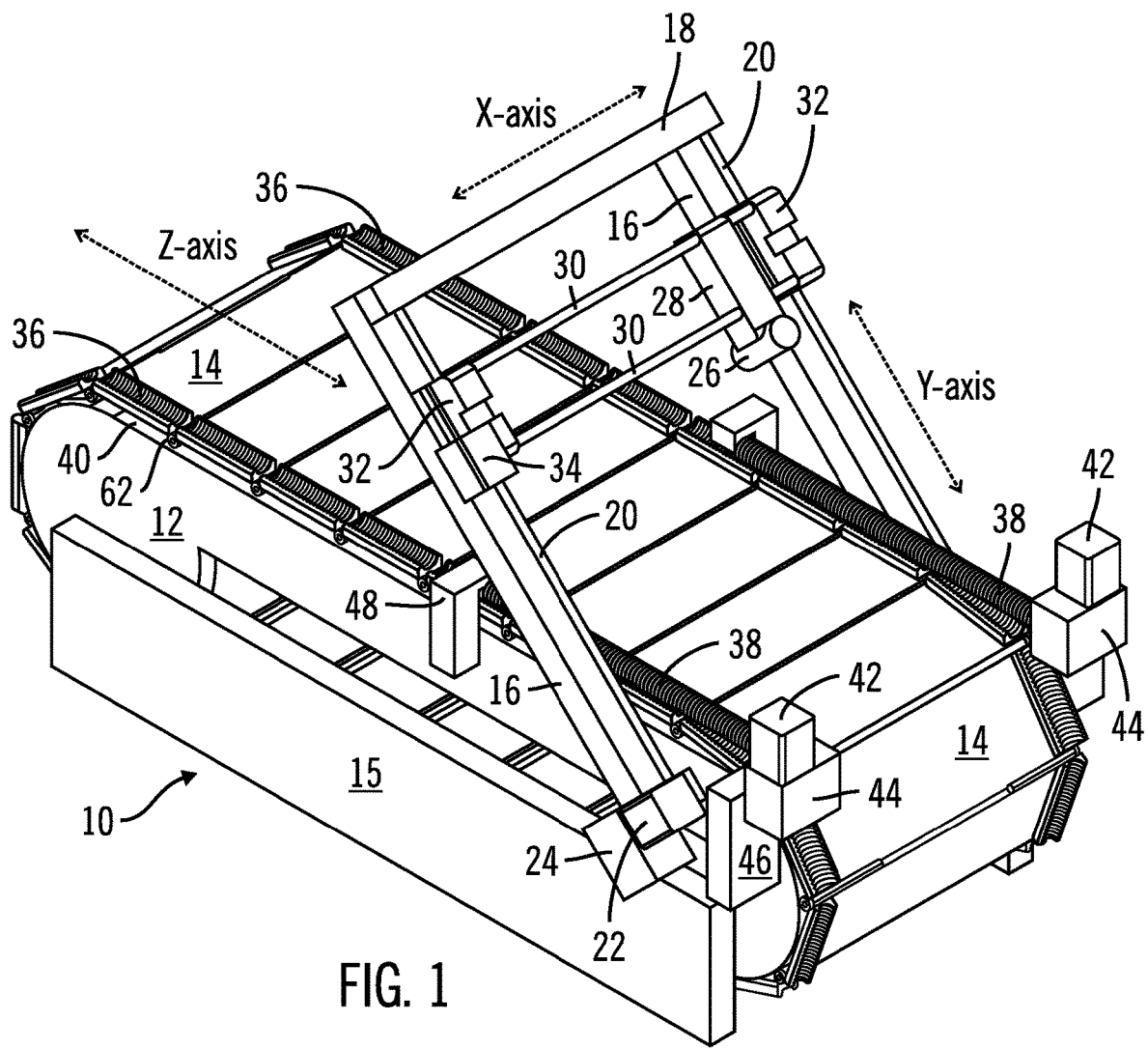
FIG. 1 illustrates, in a block diagram, a 3D printer in accordance with certain embodiments.

FIG. 1 illustrates a 3D printer 10 in accordance with certain embodiments. The printer 10 includes a printer base 12 that supports a movable print surface extending along a Z-axis and including a plurality of members 14 connected together to form a segmented endless track extending in a loop around a large portion of the base 12. The printer 10 includes a print head support frame structure that in certain embodiments is substantially U-shaped and includes arms 16 each having one end pivotally coupled to the printer base 12 and a cross-member 18 that may be positioned at an opposite end from where the arms 16 are pivotally coupled to the printer base 12. In the embodiment illustrated in FIG. 1 the print head support frame structure is substantially U-shaped, with the arms 16 being the sides of the "U" and the cross-member 18 being the bottom part of the "U". The frame structure may be pivoted so that the angle varies as desired. For example, when printing of an object begins, the angle between the arms 16 (Y-axis in FIG. 1) and the print surface (Z-axis in FIG. 1) may be set at a relatively low value when printing is started, for example, 30 degrees. If the object is to have a substantial height orthogonal to the print surface, then multiple passes of the print head over a surface may be carried out. To achieve certain heights, the angle of the print head support frame structure may be changed to a greater angle so that the print head can be positioned further away from the print surface and a thicker object can be printed. Certain embodiments utilize angles in the range of from about 10 degrees to about 90 degrees.

The base 12 may include support legs 15. The support legs 15 may include height adjust screws on a lower surface thereof if desired. Any suitable shape for the support legs may be utilized.

In the embodiment illustrated in FIG. 1, mounting structures such as, for example, threaded rods 20 are supported by the frame structure and positioned adjacent to the arms 16. The threaded rods 20 act as a screw mount to hold and position a print head support structure on which a print head 26 is mounted. The threaded rods 20 may each be attached at one end to the cross-member 18 and driven at the other end by a motor 22 coupled to a right angle drive 24 for rotating the rods 20 and moving the print head support structure holding the print head 26 in the Y-axis direction. The motor 22 and right angle drive 24 as illustrated in FIG. 1 may be coupled to an arm 16 near the pivoting end of the arm 16. It should be appreciated that embodiments may include a variety of other suitable mounting structures and drive mechanisms, including, but not limited to, belt drives and servo motors.

The print head support structure illustrated in the embodiment of FIG. 1 may include a number features for holding and moving the print head 26. The print head 26 may be coupled to support structure 28 that is positioned on a drive belt 30 that moves in the region between mounts 32 that support the drive belt 30. The mounts 32 are positioned on the threaded rods 20 for motion along the Y-axis. A motor 34 may be positioned on one of the mounts 32 to control the motion of the drive belt 30 to position the print head 26 along the X-axis direction. In certain embodiments, the motor 34 may be a stepper motor. Any suitable control mechanisms for controlling the motion of the print head 22 on the print heat support 24 along the X-axis may be utilized, including, but not limited to, screw drives and servo motors. The print head 26 may operate by ejecting material through one or more nozzles thereon. The printer 10 may include any suitable feed mechanism for transmitting the material to be printed to the print head, including, but not limited to, a head mounted feeder. Typical materials printed include, but are not limited to, polymeric materials.

Figure 2:
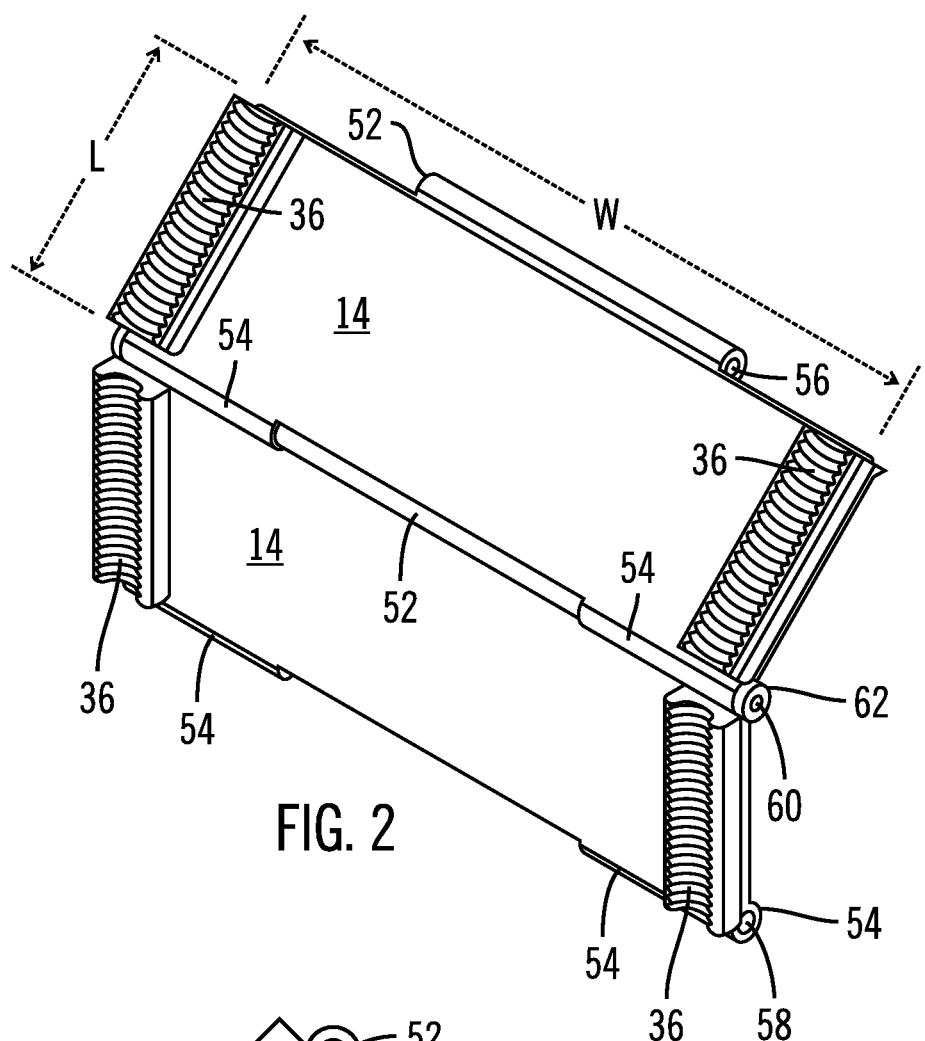
FIG. 2 illustrates two members coupled together, in accordance with certain embodiments.

As noted above, the print surface includes a plurality of members 14 that move along a rail on the base 12 along the Z-axis and are coupled together in a hinged configuration that permits the formation of a loop extending around a portion of the printer base 12. The members 14 may include an upper surface that is substantially rectangular in shape. The members 14 may be any desired size, with certain embodiments including a width (W) of about 2 feet and a length (L) of about 6 inches. FIG. 2 illustrates the width (W) and length (L) dimensions of a member 14. The members 14 coupled together in the loop formation may in some ways resemble a tank track. As illustrated in the embodiment of FIG. 1, the movement of the members 14 may be controlled by a suitable drive mechanism including, but not limited to, a trapezoidal screw drive. The members 14 include thread receiving regions 36 into which threads on rods 38 may be engaged to move the members 14 along the track or rail portion 40 of the printer base 12.

Figure 3:
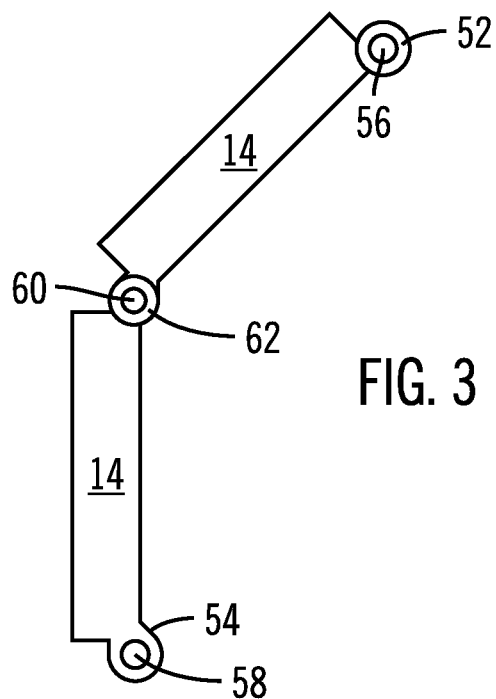
FIG. 3 illustrates a side view of the two members of FIG. 2, in accordance with certain embodiments.
Figure 4:
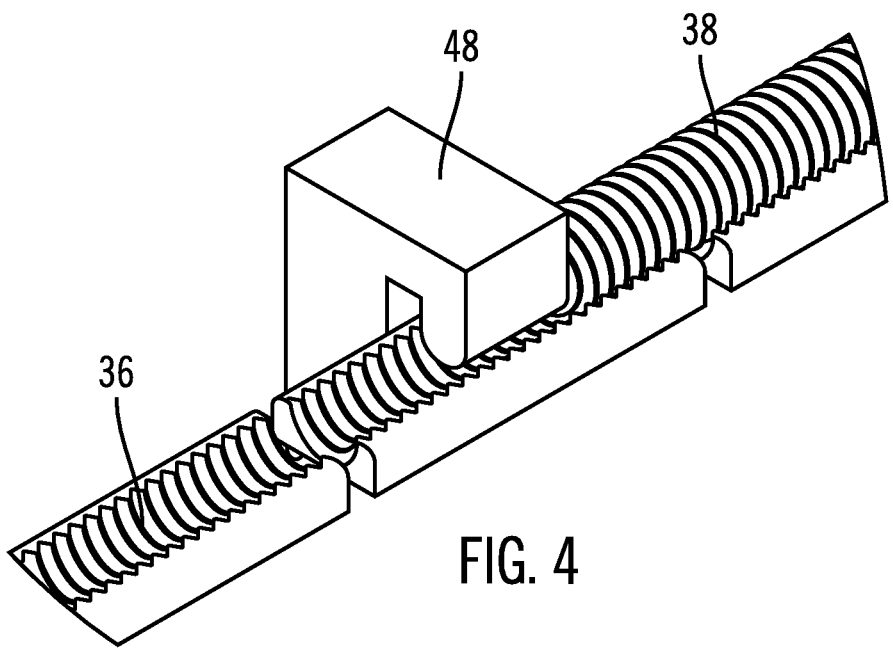
FIG. 4 illustrates a threaded rod engaged in a hold-down mechanism, in accordance with certain embodiments.
Figure 5:
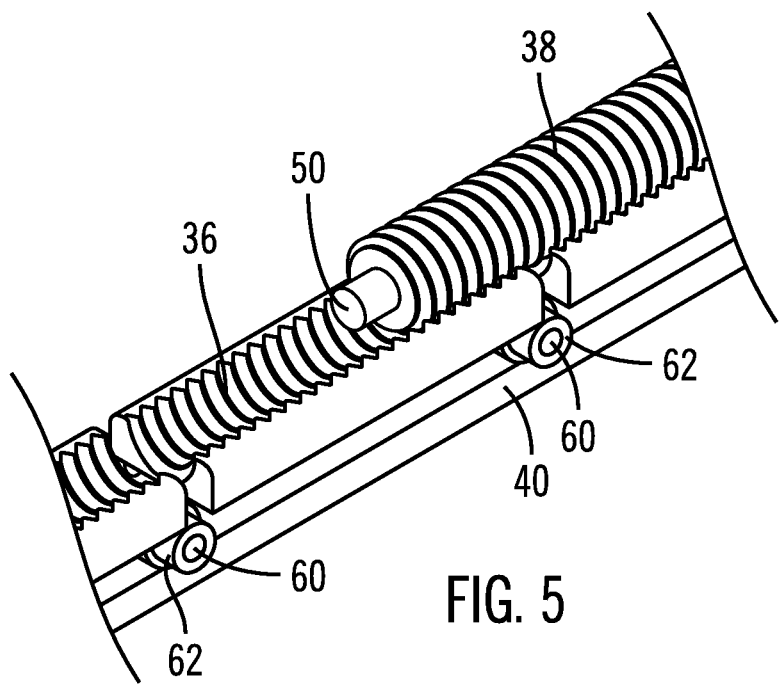
FIG. 5 illustrates a threaded rod positioned in a thread receiving region, in accordance with certain embodiments.

FIG. 2-3 illustrates a view of two adjacent members 14 coupled together, showing the hinged connection between the members 14, in accordance with certain embodiments. The members 14 include thread receiving regions 36 towards the sides thereof and are sized to accept a threaded rod 38 therein. The threaded rods 38, seen in FIG. 1, may extend along a distance of the printer and engage the thread receiving regions 36 to move the members 14 along the track or rail portion 40 of the base 12. In the embodiment illustrated in FIG. 1, the threaded rods 38 extend slightly less than one half the length of the printer 10. Other lengths could also be utilized. The threaded rods 38 may include one end coupled to a right angle drive 44 coupled to a motor 42, as illustrated in FIG. 1. The other end of each of the threaded rods 38 may be held in place by a hold-down structure 48 configured to hold the threaded rod 38 in position on the threaded region 36, as illustrated in FIG. 4. As illustrated in FIG. 5, the threaded rod 38 may include a peg-like end region 50 that can be fit into the hold-down structure 48. The hold-down structure 48 may in certain embodiments be coupled to the printer base 12 at a side surface thereof.

Rotation of the threaded rods 38 may be controlled by a motor 42 coupled to a right angle drive 44 at an end of each of the threaded rods 38. The right angle drive 44 may be coupled to a portion 46 of the base 12, as illustrated in FIG. 1. Certain embodiments utilize a stepper motor, through any suitable drive mechanism may be used. The use of two rods 38 as drive screws to move the members 14 permits precise control and application of force and yields a stable printing surface.

As seen in FIG. 2, a hinged connection is made between adjacent members 14. In certain embodiments, the members 14 include a central knuckle portion 52 on one end region and outer knuckle portions 54 on the opposite end region. The knuckle portions 52, 54 have openings 56, 58 extending therethrough and can rotate around a rod or pin 60 positioned therein. As illustrated in FIG. 2, the central knuckle portion 52 on the lower member 14 is positioned between the outer knuckle portions 54 on the upper member 14, and the openings lined up to form a barrel into which pin 60 is positioned. The pin 60 may include or be coupled to a roller bearing wheel structure 62 positioned at its ends so that the members 14 can smoothly move along the printer base 12. As seen in the embodiment illustrated in FIG. 1, the members 14 are supported by the roller bearing wheel structures 62 positioned on the rail portion 40.

FIG. 3 illustrates a side view of the members 14 of FIG. 2, showing the hinged connection therebetween. As seen in FIG. 3, the central knuckle portion 52 of the upper member 14 and the outer knuckle portion 54 of the lower member are not connected to an adjacent member and so the openings 56, 58 are illustrated. The outer knuckle portions 54 of the upper member 14 and the central knuckle portion 52 of the lower member 14 are aligned and pin 60 having the roller bearing wheel structure 62 extends therethrough to form the hinged connection between the members 14.

The members 14 may in certain embodiments be formed from one or more materials that provide a stable printing surface, including, but not limited to, polymers, ceramics, metals, and composites. The members 14 may be formed to include one or more rigid layers. Any suitable printing surface coating may be used on the surface of the members 14 if desired, including, but not limited to, a liquid or solid sheet coating layer. While substantially rectangular shaped members 14 are illustrated, other morphologies are possible. In certain embodiments the printer 10 may include a heating mechanism for heating the members 14 to a desired temperature.

During operation, depending on the size of the object to be printed, a support table may be positioned at an end of the printer 10 to hold the printed object as the members 14 making up the printing surface move along the Z-axis direction and travel downward and around the loop.

Any suitable methods for powering and controlling the printer may be used, including, but not limited to, the use of G-code programming language to provide control instructions such as, for example, for driving the print head and controlling filament feed and hot point temperature. The printer 10 may be configured with suitable hardware and circuitry for communication (wired and/or wireless) with a controller, computer, or the like.

Embodiments also relate to methods for forming and using a 3D printer. Certain methods relate to providing a movable print surface configured in a loop and positioning a system for moving one or more print heads in multiple directions over the print surface.

FIG. 6 is a flowchart of operations in accordance with certain embodiments. Block 70 is providing a plurality of members to be used as a print surface. Box 72 is coupling the members together in a looped configuration to form an endless track. The looped configuration may in certain embodiments be like that illustrated in FIG. 1, including the members 14 that are coupled together in a hinged arrangement as illustrated in FIGS. 2-3. Block 74 is positioning a screw drive mechanism to engage threads in the members. The screw drive mechanism may in certain embodiments comprise a structure such as that illustrated in FIGS. 1 and 4-5, including threaded rods 38 that engage thread receiving regions 36 on the members 14, and including the use of stepper motors 42 to provide precise rotational control of the threaded rods 38. Block 76 includes positioning a system for moving one or more print heads in multiple directions over the print surface. Such a system may include a framed support structure extending over a print surface, such as that illustrated in FIG. 1, including arms 16 and cross member 18 that support mechanisms such as screw drive and/or belt drive mechanisms to move one or more print heads 26 in X-axis and Y-axis directions over the print surface members 14.

FIG. 7 is a flowchart of operations for a method for 3D printing in accordance with certain embodiments. Block 80 is providing a movable print surface extending in a loop, such as the print surface made up of the members 14 illustrated in FIGS. 1-3 above. Block 82 is providing a positioning system to move one or more print heads in multiple directions over the print surface, such as that illustrated in FIG. 1, including arms 16 and cross member 18 that support mechanisms such as screw drive and/or belt drive mechanisms to move a print head in multiple directions over the print surface members 14. Block 84 is supplying a printing material to the print head. Such printing material may be any desired printing material, including, but not limited to, a polymer. Block 86 is ejecting the printing material from the print head to the print surface. Block 88 is moving the print surface a distance around the loop and then ejecting additional material from the print head to the print surface. Depending on the length of the object being printed, a support table may be positioned at an end of the printer to support the object as the members making up the print surface extend downward and loop around the printer.

Embodiments provide certain advantages over conventional 3D printers. First, objects that are large relative to the dimensions of the printer may be formed due to the endless track structure, which enables a user to print unlimited length objects along the Z-axis direction (as illustrated in FIG. 1). In addition, the tracked design of the print surface in certain embodiments, including the members 14, the screw drive mechanism for moving the members 14, allows precise control of the print space and provides a more stable printing platform and pressure application.

Various features of embodiments described above may be implemented with respect to other embodiments, including apparatus and method embodiments. The order of certain operations as set forth in embodiments may also be modified. Specifics in the examples may be used anywhere in one or more embodiments.

The terms "a" and "an" mean "one or more", unless expressly specified otherwise. Terms such as "first", "second", and the like may be used herein and do not necessarily denote any particular order, quantity, or importance, but are used to distinguish one element from another. Terms such as "upper", "lower", "top", "bottom", and the like may be used for descriptive purposes only and are not to be construed as limiting.

The foregoing description provides examples of embodiments of the invention, and variations and substitutions may be made in other embodiments. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. Embodiments may be manufactured, used, and contained in a variety of positions and orientations.

In the present description, various features are sometimes grouped together in a single embodiment, figure, or description thereof for the purpose of streamlining the disclosure and aiding in the understanding of one or more of the various inventive aspects. This method of disclosure is not to be interpreted as reflecting an intention that the claimed embodiments of the invention require more features than are expressly recited in each claim. Rather, as the claims reflect, inventive subject matter may lie in less than all features of a single disclosed embodiment. Thus the claims are hereby incorporated by reference into this detailed description.

What is claimed is:

1. A three dimensional printer comprising:
  a printer base including a rail portion;
  a moveable print surface including members coupled to form a loop and configured to move along the rail portion of the printer base, wherein the members include a thread receiving portion configured to receive screw threads therein;
  a rod including screw threads configured to engage the thread receiving portion;
  a print head; and
  a print head positioning system configured to move the print head in multiple directions over the print surface.

2. The three dimensional printer of claim 1, wherein the print head positioning system comprises a frame pivotally coupled to the printer base.

3. The three dimensional printer of claim 1, wherein the members are rigid.

4. The three dimensional printer of claim 1, wherein the thread receiving portion includes a first thread receiving region and a second thread receiving region spaced apart from the first thread receiving region, and wherein the rod comprises a first rod including screw threads positioned to engage the first thread receiving region and a second rod including screw threads positioned to engage the second thread receiving region.

5. The three dimensional printer of claim 1, wherein the members are positioned so that adjacent members are coupled together with a hinged connection.

6. The three dimensional printer of claim 1, wherein the print head comprises a plurality of print heads.

7. A three dimensional printer comprising:
  a printer base including a rail portion;
  a moveable print surface including members coupled to form a segmented endless track configured to move along a Z-axis direction on the rail portion of the printer base, wherein the members include first and second thread receiving regions configured to receive screw threads therein;

a print head;

a print head positioning system including a frame pivotally coupled to the printer base, the print head positioning system configured to move the print head along an X-axis direction and a Y-axis direction over the printer base; and first and second rods having screw threads configured to engage the first and second thread receiving regions.

8. The three dimensional printer of claim 7, wherein the frame comprises a first arm, a second arm, and a cross-member extending from the first arm to the second arm, the first arm and the second arm each pivotally coupled to the printer base.

9. The three dimensional printer of claim 8, wherein the print head positioning system includes a screw driven mechanism to move the print head along the Y-axis direction and a belt driven mechanism to move the print head along the X-axis direction.

10. The three dimensional printer of claim 7, wherein the frame pivotally coupled to the printer base is configured to pivot between about 10 degrees and 90 degrees to the Z-axis direction.

11. The three dimensional printer of claim 7, wherein the members are positioned to extend in a loop about the rail portion to form the segmented endless track.

12. The three dimensional printer of claim 7, wherein the members are positioned so that adjacent members are coupled together with a hinged connection.

13. A three dimensional printer comprising:
a printer base;
a moveable print surface comprising rigid members coupled together to form a loop around at least a portion of the printer base, wherein at least some of the rigid members include a thread receiving portion configured to receive screw threads therein;
a rod including screw threads configured to engage the thread receiving portion;
a print head; and
a print head positioning system configured to move the print head in multiple directions over the print surface.

14. The three dimensional printer of claim 13, wherein the print head positioning system comprises a frame pivotally coupled to the printer base.

15. The three dimensional printer of claim 13, wherein the thread receiving portion includes a first thread receiving region and a second thread receiving region spaced apart from the first thread receiving region, and wherein the rod includes a first rod including screw threads positioned to engage the first thread receiving region and a second rod including screw threads positioned to engage the second thread receiving region.

16. The three dimensional printer of claim 13, wherein the rigid members are positioned so that adjacent members are coupled together with a hinged connection.

17. The three dimensional printer of claim 13, wherein the moveable print surface includes a printing surface coating.

18. The three dimensional printer of claim 13, wherein the print head positioning system comprises a frame pivotally coupled to the printer base, the frame comprising a first arm, a second arm, and a cross-member extending from an end region of the first arm to an end region of the second arm.

19. The three dimensional printer of claim 13, wherein the printer base includes a rail portion, and where the rigid members move along the rail portion.

20. The three dimensional printer of claim 19, further comprising wheel structures positioned to support the rigid members and move along the rail portion.

* * * * *